Patented June 16, 1931

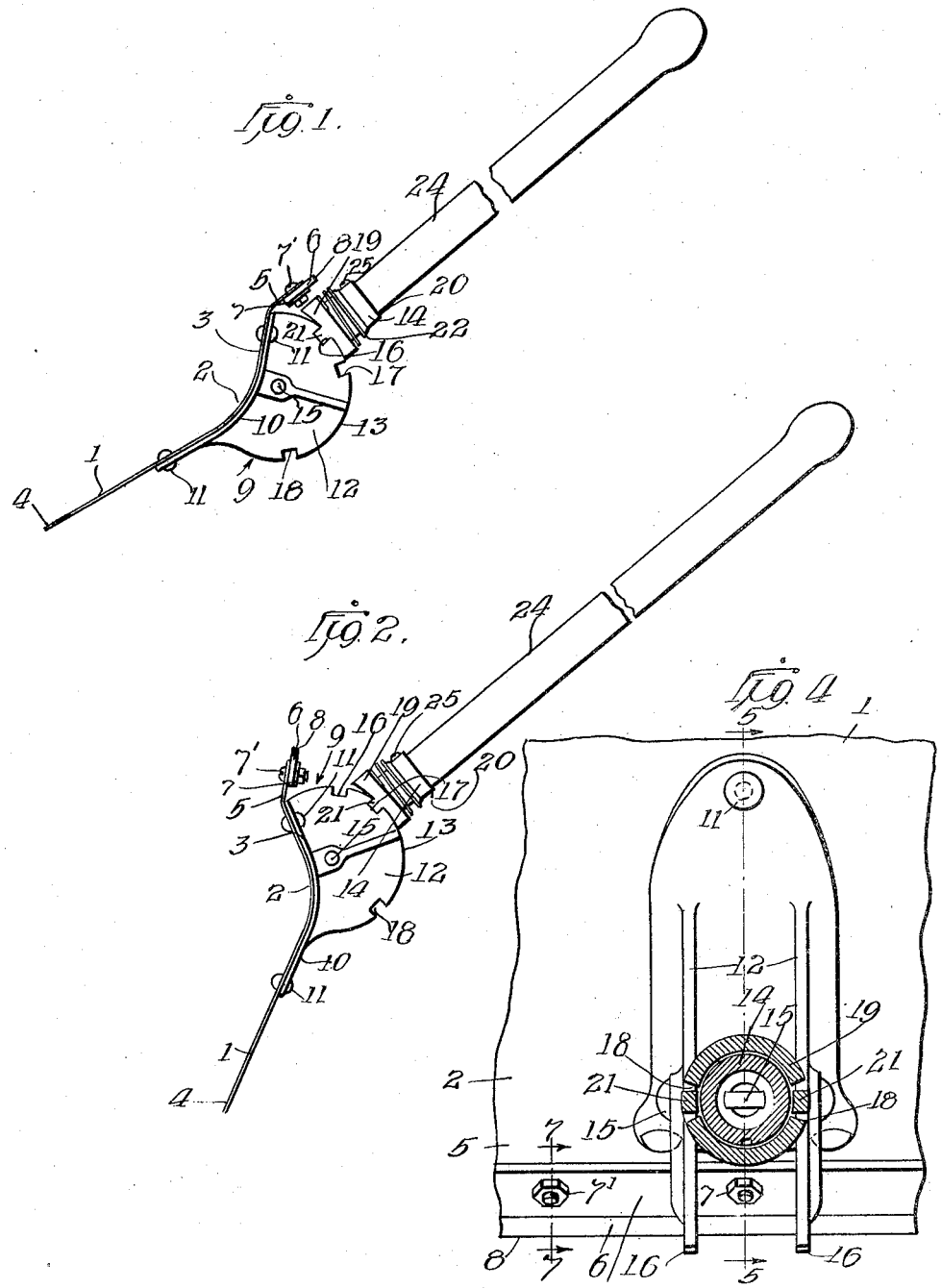

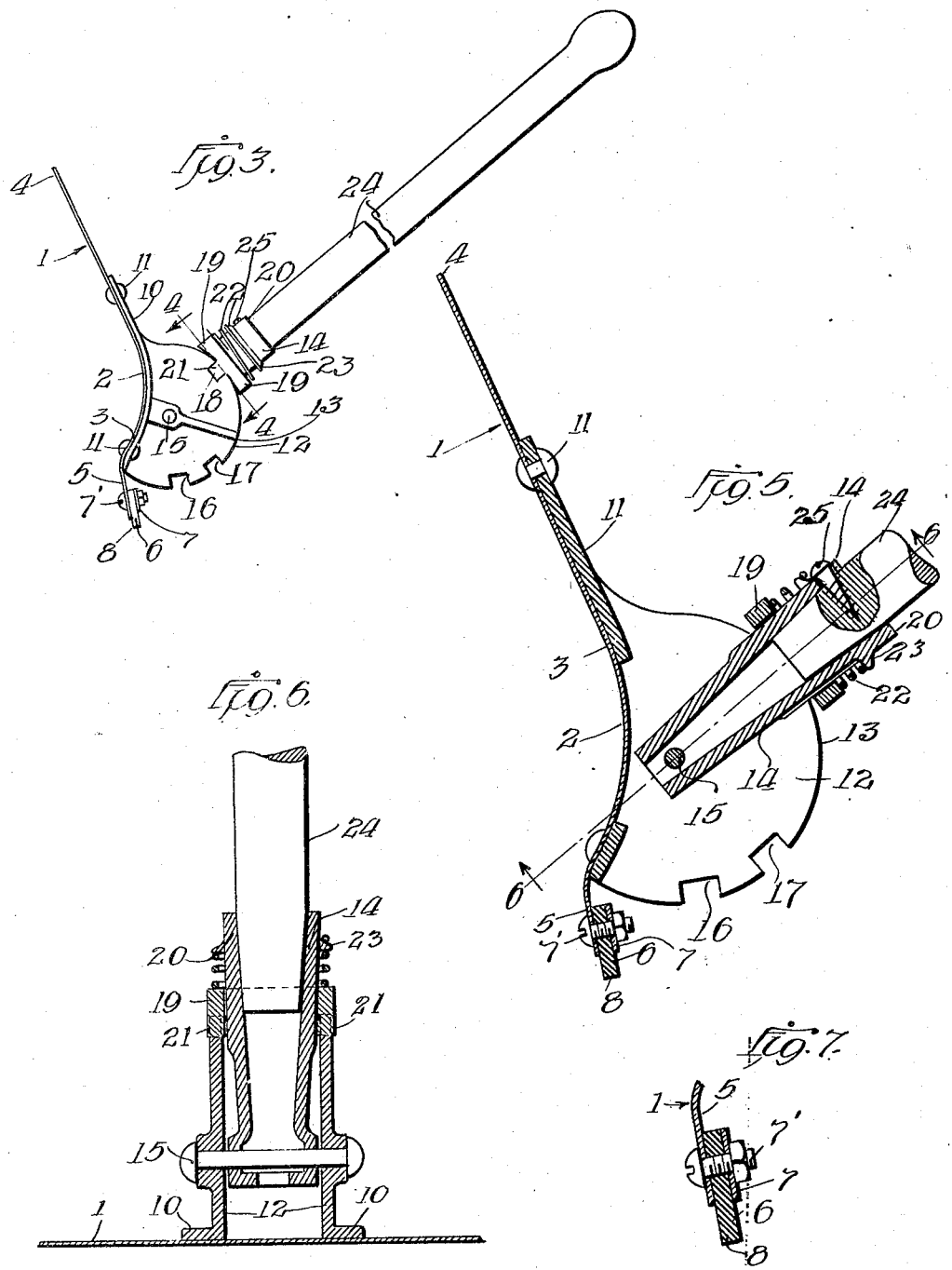

1,810,026

UNITED STATES PATENT OFFICE

EMIL R. MOLLER, OF CHICAGO, ILLINOIS, ASSIGNOR OF ONE-HALF TO GEORGE A. MOLLER, OF CHICAGO, ILLINOIS

SNOW HANDLING IMPLEMENT

Application filed July 12, 1929. Serial No. 377,813.

This invention relates to improvements in implements for removing snow and slush from sidewalks, etc. and has special reference to the provision of an implement which will serve as a snow shovel, a snow pusher or plow, and a scraper which is especially adapted for use on wooden surfaces such as painted porches and the like.

The object of the invention is to provide an implement of the character mentioned which shall be of durable construction and which shall be capable of being readily arranged for any of the uses for which it is constructed.

The invention resides in an implement having a shovel-like member and a handle adjustably secured thereto in a novel manner and whereby the shovel-like member is readily and easily adjustable in reference to the handle, so that it can be used as a shovel or as a pusher, or the rear edge can be used as a scraper, the rear edge being provided with a rubber wearing strip so that it can be used on wooden surfaces such as painted porches, steps, etc. without scraping off the paint.

The invention will be more readily understood by reference to the accompanying drawings forming part of this specification and in which:—

Fig. 1 is a side elevation of a device embodying the invention and shown as arranged for use as a snow shovel;

Fig. 2 is a similar view showing the device arranged for use as a snow plow or pusher;

Fig. 3 is a similar view showing the device arranged for use as a scraper or slush pusher;

Fig. 4 is a fragmentary transverse sectional view on the line 4—4 of Fig. 3;

Fig. 5 is a vertical sectional view on the line 5—5 of Fig. 4; and

Fig. 6 is a fragmentary horizontal longitudinal section on the line 6—6 of Fig. 5; and Fig. 7 is a fragmentary vertical sectional view on the line 7—7 of Fig. 4.

In said drawings, 1 represents the shovel member which is formed from an elongated, rectangular flat plate by bending it up on a curve, as shown at 2, parallel with its longitudinal edges to give it a slight scoop form, having a bent-up rear portion 3 and a flat straight front edge portion 4. The extreme edge portion 5 opposite to the edge 4 is bent back to extend substantially parallel with the front edge portion and is equipped with a substantial strip of rubber 6 which is secured between the edge portion 5 of the shovel member 1 and a sheet metal strip 7 by bolts 7', the rubber strip 6 being arranged with one edge 8 extending out beyond adjacent edge of the shovel member 1 and adapted to act as a soft or yielding scraper element for use on wooden surfaces such as porches, steps, etc.

The shovel member 1 has a connecting bracket 9 secured to its rear face at the transverse center of the curved portion 2. The bracket 9 consists of a base plate 10 conformed to the shape of the plate 1 and secured rigidly to same by rivets 11.

Rising from the base plate 10 are a pair of parallel connection plates 12 provided with arcuate outer edges 13. A handle socket member 14 is mounted between the plates on a pivot 15 to swing up and down to different angular relations to the shovel member 1.

The arcuate edges 13 of the plates 12 are provided with pairs of notches 16, 17 and 18, and a collar 19 is slidably mounted on the outer end 20 of the socket member 14. The collar 19 is provided with two oppositely arranged projections 21 adapted to enter the notches in the edges of the plates 13 and securely retain the socket member 14 in a desired relation to the shovel member 1. A coiled spring 22 is provided, which is mounted on the outer end of the socket member between a circumferential shoulder 23 on the socket member and the outer end of the collar 19 and which yieldingly holds the collar pressed inwardly with the projections 21 engaged in one of the pairs of notches. The socket member 14 carries an elongated handle 24 which may be secured by any suitable means such as a screw 25. The spring 22 permits the collar 19 to be drawn back to free it of the notches, and then the handle 24 can be swung to another position.

As shown, the notches 16 are adapted to hold the handle 24 at a suitable angle to the shovel member 1 in order to use the device as a snow shovel, as shown in Fig. 1, for lifting and throwing the snow.

The notches 17, as shown in Fig. 2, are adapted to hold the handle 24 at a suitable angle for using the device as a snow plow or pusher.

The notches 18, as best shown in Fig. 3, are adapted to hold the handle 24 at a suitable angle to the member 2 so that the rear edge with the rubber strip 6 can be used as a scraper for removing light snow, slush or water from surfaces which the opposite metal edge might injure; that is, porches, steps, etc., especially those which are painted.

The implement is quite substantial; it is simple in construction, and it is readily changed to arrange it for the several uses. It is simply necessary to pull back the collar 19 to free it from the notches, swing the handle to the new position, and let the spring 22 push the collar into engagement with the projections 21 in the new pair of notches. This change or adjustment can be accomplished very quickly and easily and without the use of any wrenches or other tools.

As many modifications of the invention will readily suggest themselves to one skilled in the art, I do not limit or confine the invention to the specific details of construction and operation herein shown and described.

I claim:

1. In a combined scoop and scraper, a scraper member formed of a flat plate curved up at one edge portion to form a scoop, a handle member pivotally mounted on the back of the scoop and means for retaining the handle at various angles to the scoop, the edge portion of the curved part of the scoop bent back into a plane nearly parallel with the front uncurved portion.

2. In a combined scoop and scraper, a scraper member formed of a flat plate curved up at one edge portion to form a scoop, a handle member pivotally mounted on the back of the scoop and means for retaining the handle at various angles to the scoop, the edge portion of the curved part of the scoop bent back into a plane nearly parallel with the front uncurved portion, and a rubber scraper strip secured on said bent back edge to serve as a squeegee.

In witness that I claim the foregoing as my invention, I affix my signature this 29th day of June, 1929.

EMIL R. MOLLER.